US011780585B2

(12) United States Patent
Rousse et al.

(10) Patent No.: US 11,780,585 B2
(45) Date of Patent: Oct. 10, 2023

(54) PASSENGER SEAT ARRANGEMENT

(71) Applicants: Safran Seats, Plaisir (FR); Safran Seats USA LLC, Gainesville, TX (US)

(72) Inventors: Florelle Rousse, Viroflay (FR); Arthur Glain, Boulogne Billancourt (FR); Adrien Beauvais, Abondant (FR); Nguyen Foek Le, Arlington, TX (US); David Morales, Chihauhua (MX)

(73) Assignees: Safran Seats, Plaisir (FR); Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/783,732

(22) PCT Filed: Dec. 9, 2020

(86) PCT No.: PCT/EP2020/085236
§ 371 (c)(1),
(2) Date: Jun. 9, 2022

(87) PCT Pub. No.: WO2021/122207
PCT Pub. Date: Jun. 24, 2021

(65) Prior Publication Data
US 2023/0002056 A1    Jan. 5, 2023

(30) Foreign Application Priority Data
Dec. 20, 2019  (FR) .......................... 1915108

(51) Int. Cl.
*B64D 11/06*        (2006.01)
*B64D 11/00*        (2006.01)
(52) U.S. Cl.
CPC ...... *B64D 11/0601* (2014.12); *B64D 11/0015* (2013.01); *B64D 11/0605* (2014.12); *B64D 11/0606* (2014.12); *B64D 11/0641* (2014.12)

(58) Field of Classification Search
CPC .... B64C 1/0601; B64C 1/0606; B64C 1/0641
See application file for complete search history.

(56) References Cited

U.S. PATENT DOCUMENTS

D443,990 S       6/2001   Beroth
7,721,990 B2 *   5/2010   Jaeger ................ B64D 11/0606
                                                            244/118.6
(Continued)

FOREIGN PATENT DOCUMENTS

EP       2944571        11/2015
EP       3521167         8/2019
(Continued)

OTHER PUBLICATIONS

International Patent Application No. PCT/EP2020/085236, International Preliminary Examination Report, dated May 17, 2022.
(Continued)

*Primary Examiner* — Joshua J Michener
*Assistant Examiner* — Michael B. Kreiner
(74) *Attorney, Agent, or Firm* — Kilpatrick Townsend & Stockton LLP

(57) ABSTRACT

The present invention relates to an aircraft cabin having a longitudinal axis and comprising at least one aisle and an arrangement of seat units, a seat unit comprising, in particular, a seat provided with a base and a backrest as well as a foot area, the seat being movable between a sitting position and a lying position, the arrangement of seat units comprising:
  at least one rear group of two seat units,
  at least one front group of two seat units,
  each group of two seat units comprising a seat unit arranged on the side of the aisle and referred to as the "aisle-side seat unit" and a seat unit arranged on the side of a window and referred to as the "window-side seat unit", (Continued)

each seat of a group of seat units having an axis forming a non-zero angle relative to the longitudinal axis of the aircraft cabin, such that the seats of each group are facing the aisle, a first passage for accessing the aisle associated with the window-side seat unit of the rear group extending between the foot area and the seat of the aisle-side seat unit of the rear group, and a second passage for accessing the aisle associated with the window-side seat unit of the rear group extending between the aisle-side seat unit of the front group and the foot area of the aisle-side seat unit of the rear group.

18 Claims, 3 Drawing Sheets

(56) References Cited

U.S. PATENT DOCUMENTS

| | | | | |
|---|---|---|---|---|
| 8,882,036 | B2* | 11/2014 | Henshaw | B64D 11/0601 244/118.6 |
| 8,998,139 | B2* | 4/2015 | Dryburgh | B64D 11/0604 244/118.6 |
| 9,162,766 | B2* | 10/2015 | Saint-Jaimes | B64D 11/0601 |
| 9,718,550 | B2* | 8/2017 | Ko | B65G 47/917 |
| 9,802,705 | B2* | 10/2017 | Cooke | B64D 11/0606 |
| 10,807,717 | B2* | 10/2020 | Heimbach | B64D 11/0627 |
| 10,899,455 | B2* | 1/2021 | Sieben | B60N 2/01 |
| 2019/0233116 | A1* | 8/2019 | Braca | B64D 11/0639 |

FOREIGN PATENT DOCUMENTS

| | | | | |
|---|---|---|---|---|
| WO | 2014049362 | | 4/2014 | |
| WO | WO-2018033599 | A1* | 2/2018 | B64D 11/0601 |
| WO | WO-2020239579 | A1* | 12/2020 | B64D 11/0601 |
| WO | WO-2021032724 | A1* | 2/2021 | B60N 2/01 |

OTHER PUBLICATIONS

International Patent Application No. PCT/EP2020/085236, English Translation of Written Opinion of the International Searching Authority, dated Jun. 8, 2022.

International Patent Application No. PCT/EP2020/085236, International Search Report (with English translation) and Written Opinion, dated Feb. 15, 2021.

* cited by examiner

[Fig. 1]
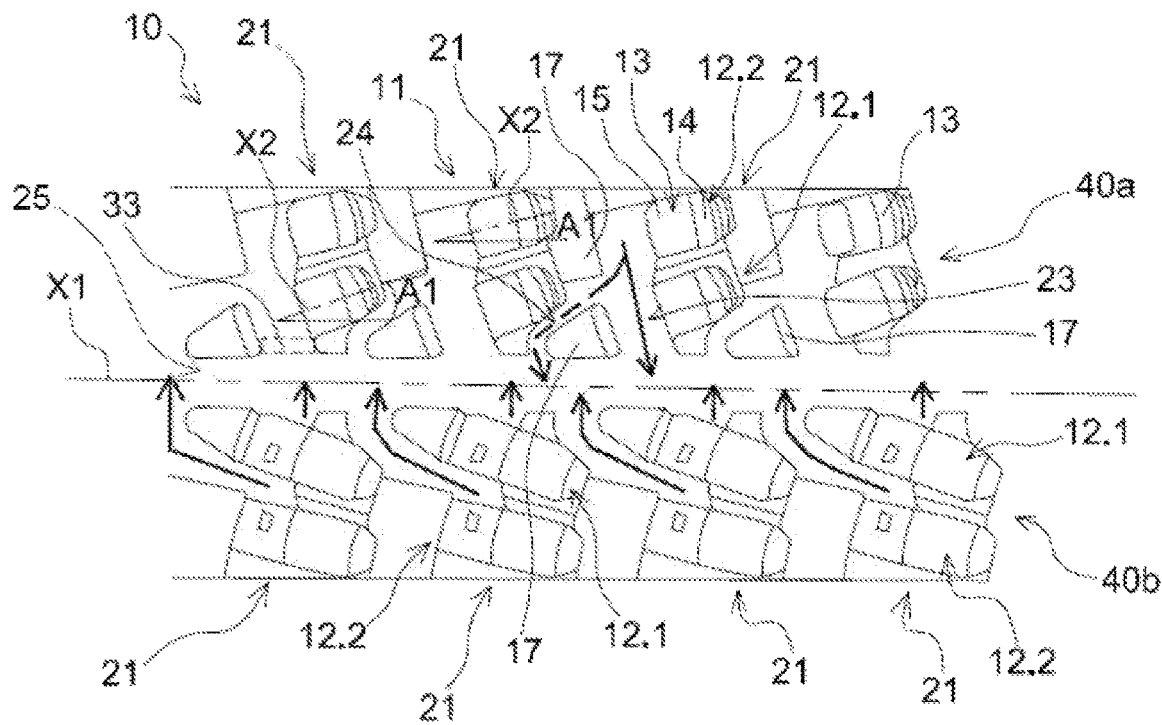
[Fig. 2]
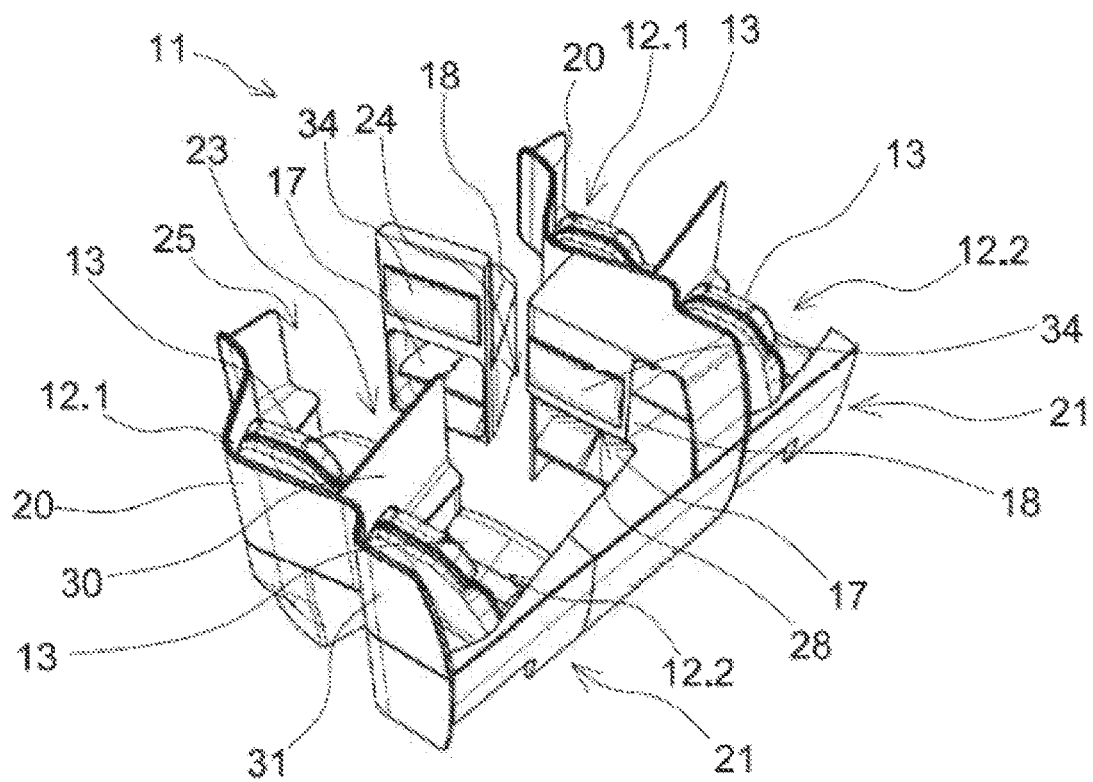

[Fig. 3]
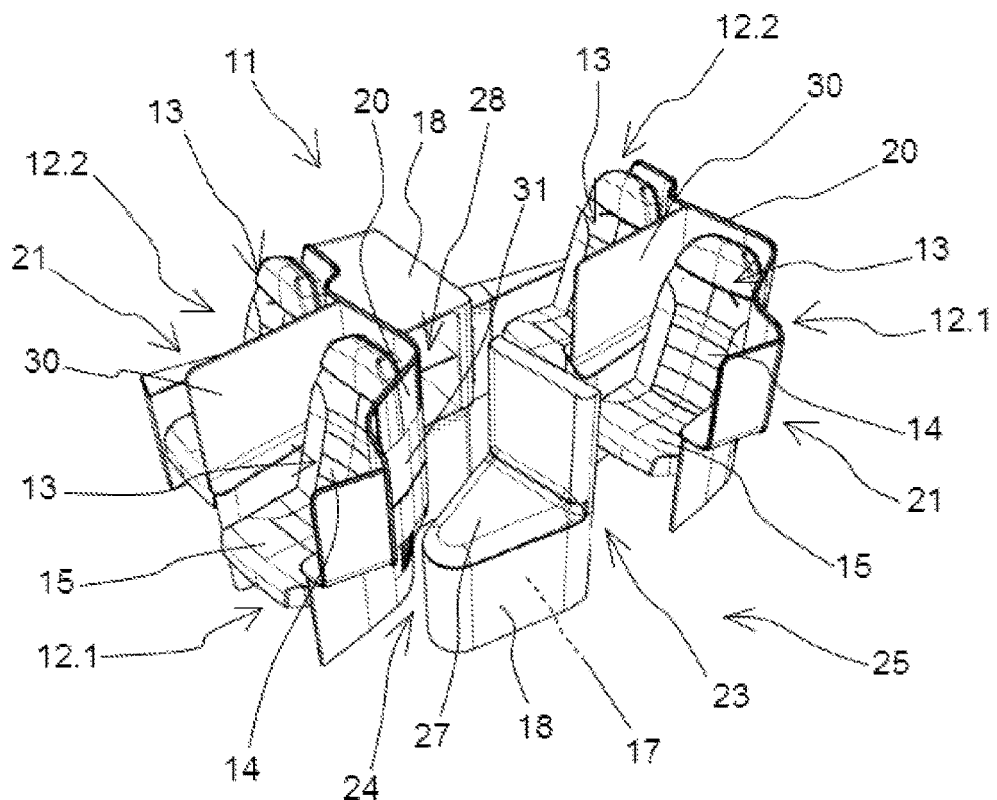
[Fig. 4]
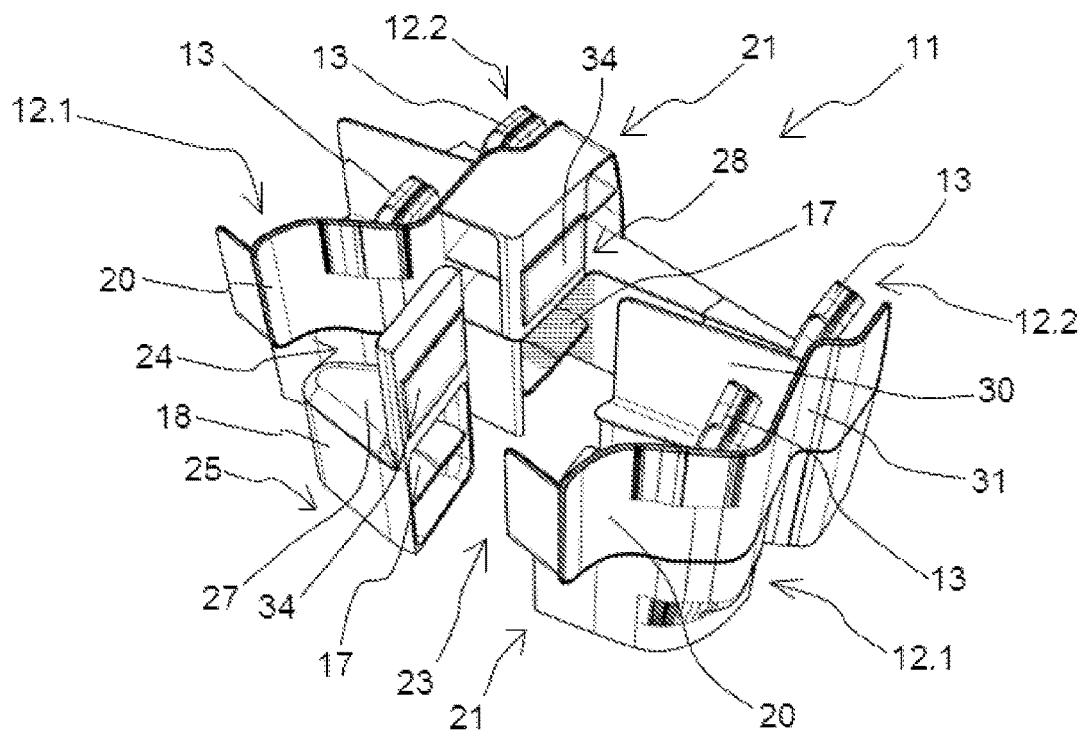

[Fig. 5]
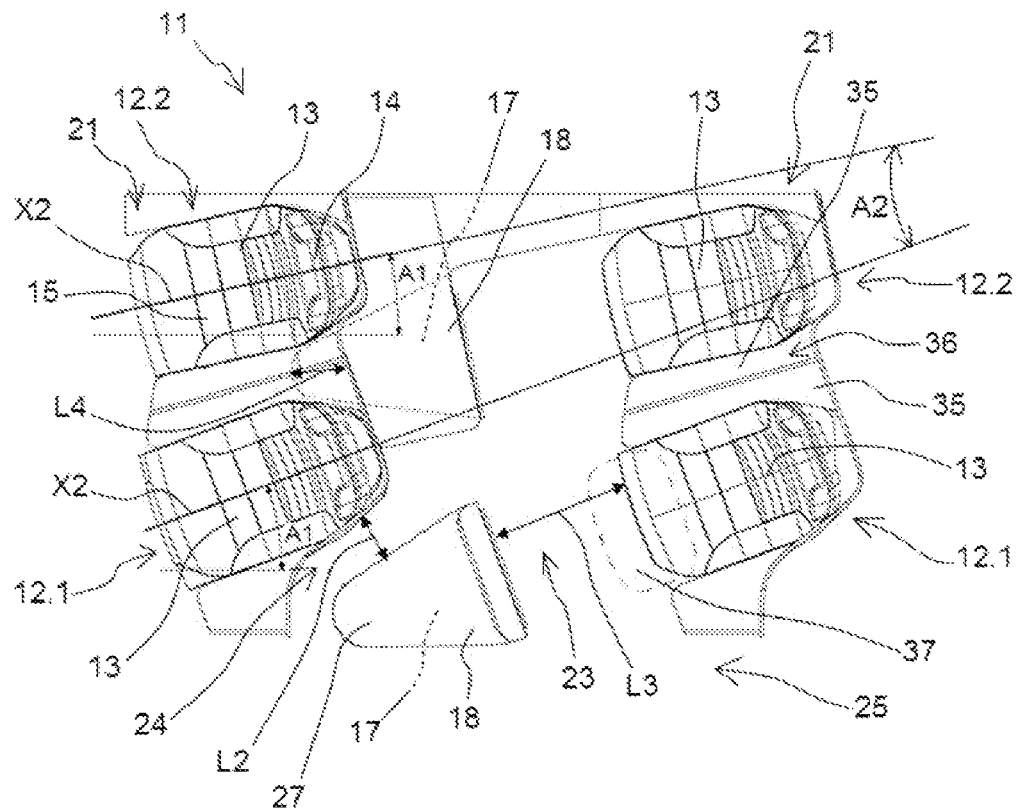
[Fig. 6]
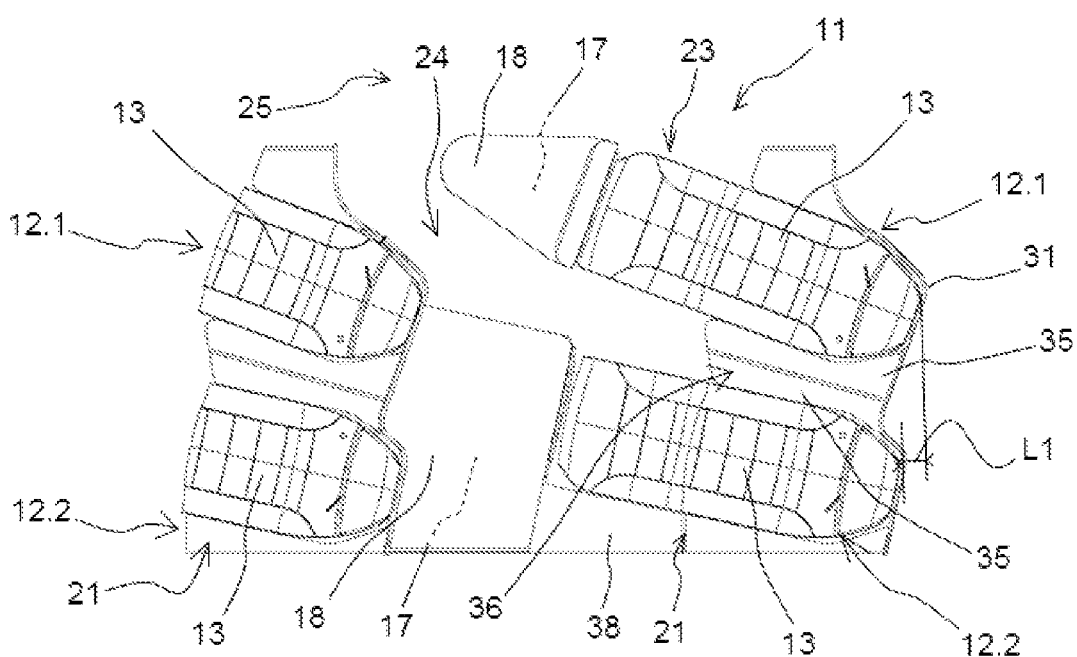

PASSENGER SEAT ARRANGEMENT

CROSS-REFERENCE TO RELATED APPLICATIONS

This application is a national phase application of International Patent Application PCT/EP2020/085236, filed on Dec. 9, 2020 and titled "Passenger Seat Arrangement," which is related to and claims priority to French Patent Application No. 1915108, filed on Dec. 20, 2019, both of which are hereby incorporated by reference in their entireties.

The present invention relates to a seat passenger arrangement. The invention finds a particularly advantageous, but not exclusive, application in the field of commercial aviation, mainly for an aircraft cabin space of the business or premium class type.

In recent years, many business class seat arrangements have been developed in order to find a compromise between passenger comfort and optimization of the seat filling density inside the aircraft cabin. Seat arrangements must also guarantee sufficient space for the service performed by the flight staff. However, few solutions are suitable for single-aisle aircraft, mainly used for short- and medium-haul aircrafts.

Indeed, in the existing seat arrangements, direct access to the aisles for all the seats is not systematically guaranteed. In addition, the layouts for the premium and business class cabins do not all include seats suitable for taking up a bed position. Passenger spaces can also vary according to the position of the seat inside the aircraft cabin. Existing seat configurations are also difficult to adapt to different cabin sizes and may present access problems for people with reduced mobility.

Document WO2014/049362 describes a seat unit arrangement comprising at least one rear group of two seat units and at least one front group of two seat units. Each group of two seat units comprises a seat unit arranged on the aisle side and a seat unit arranged on the window side. However, the seats located side by side in a group are isolated from each other, requiring that the width of the access passage for the seats on the window side be at least equal to the standard width (27.94 cm or 11 inches) in order to guarantee an emergency evacuation. Such a width therefore reduces the passenger space. In addition, the seats located on the window side are aligned and arranged one behind the other, which does not make it possible optimize the filling of the aircraft cabin.

The invention aims to remedy these drawbacks effectively by proposing an aircraft cabin having a longitudinal axis and comprising at least one aisle and a seat unit arrangement, a seat unit comprising in particular a seat provided with a seating surface and a backrest as well as a foot area, said seat being movable between a sitting position and a bed position, said seat unit arrangement comprising:

at least one rear group of two seat units,
at least one front group of two seat units,
each group of two seat units comprising a seat unit on the aisle side, so-called "aisle-side seat unit" and a seat unit on the window side, so-called "window-side seat unit".
each seat of a group of seat units having an axis forming a non-zero angle with respect to the longitudinal axis of the aircraft cabin, so that the seats of each group face the aisle,
a first access passage to the aisle associated with the window-side seat unit of the rear group extending between the foot area and the seat of the aisle-side seat unit of the rear group, and a second access passage to the aisle associated with the window-side seat unit of the rear group extending between the aisle-side seat unit of the front group and the foot area of the aisle-side seat unit of the rear group.

The invention thus allows direct access to the aisle for all passengers, while providing a large space and a high seat filling density inside the aircraft cabin. Furthermore, as the window-side seat has two access passages to the aisle, the dedicated passage may have a reduced width so as to optimize the lateral requirement in size of the seat units, while the first passage may be used in particular in the event of an emergency evacuation.

The invention further provides a flexible configuration that can be configured according to different aircraft cabin lengths in order to increase or decrease the cabin seat filling density without modifying the dimensions of a seat unit. The invention also provides substantially equal space for all passengers in the aircraft cabin, as well as reasonable privacy for all passengers.

According to one embodiment, a width of the second access passage is less than a width of the first access passage.

According to embodiment, there is a longitudinal overlap between at least an overlapping portion of the foot area of the aisle-side seat unit of the rear group and at least a portion of the backrest of the aisle-side seat unit of the front group.

According to one embodiment, there is a longitudinal overlap between at least a portion of the foot area of the window-side seat unit of the rear group and at least a portion of the backrest of the window-side seat unit of the front group.

According to one embodiment, the overlapping portion of the foot area with at least a portion of the seat back of the window-side seat unit of the front group is located between the two seat units of the front group.

According to one embodiment, the axes of the seats of the same group of seat units are parallel to each other.

According to one embodiment, the axes of the seats of the same group of seat units form a non-zero angle with respect to each other.

According to one embodiment, the seats of the same group of seat units are arranged side by side with respect to each other.

According to one embodiment, the seats of the same group of seat units are longitudinally offset relative to each other.

According to one embodiment, a partition separates the seats of the same group of seat units.

According to one embodiment, the partition extends from a shell at the rear of the seats to a front edge of a seating surface of a seat.

According to one embodiment, an aisle-side seat unit comprises a retractable door so as to be able selectively open or close the first access passage.

According to embodiment, a foot area is integrated into a console provided with an upper wall that can serve as a table and/or into a console provided with a storage cabinet.

According to one embodiment, a seat unit comprises a display panel.

According to one embodiment, a seat unit comprises at least one armrest.

According to one embodiment, a seat unit comprises a mobile meal flap between a deployed position and a stored position.

According to one embodiment, a transverse wall separates the front group of seat units and the rear group of seat units, said transverse wall extending from a wall of the aircraft cabin to the aisle.

According to one embodiment, the first access passage has a width of between 27.94 cm (11 inches) and 76.20 cm (30 inches).

According to one embodiment, the second access passage has a width of between 10.16 cm (4 inches) and 27.94 cm (11 inches), the value of 27.94 cm (11 inches) being excluded.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1 is a top view of an aircraft cabin provided with a seat unit arrangement according to the present inventions;

FIGS. 2, 3, and 4 are perspective views from different angles of a seat arrangement according to the present invention;

FIG. 5 is a top view of a seat unit arrangement according to the present invention showing seats in a seating position;

FIG. 6 is a top view of a seat unit arrangement according to the present invention showing seats in the bed position.

It should be noted that, in the figures, the structural and/or functional elements common to the different embodiments have the same references. Thus, unless otherwise stated, such elements have identical structural, dimensional and material properties.

FIG. 1 shows an aircraft cabin 10 extending along a longitudinal axis X1 and comprising an arrangement 11 of seat units 12.1, 12.2.

The arrangement 11 comprises a plurality of seat units 12.1, 12.2 each having an individual seat 13. A seat 13 comprises a backrest 14, in particular adjustable in inclination and seating surface 15, in particular potentially adjustable in inclination, such as this can be seen in FIG. 3.

In the example shown, the seats 13 are oriented towards the front of the aircraft cabin 10, that is to say towards an area comprising a cockpit of the aircraft. In an alternative embodiment, the seats 13 are oriented towards the rear of the aircraft cabin 10, that is to say towards an opposite area of the cockpit of the aircraft.

Advantageously, a seat 13 is able to pass from a "seating" position, corresponding to the position used in particular during the stopping, taxing, take-off and landing phases of the aircraft, and a "bed" position (see FIG. 6}, in which the seat 13 defines a substantially horizontal sleeping surface for the passenger. The "seating" position and the "bed" position are configurations of the seat 13 in two extreme positions. Preferably, the seat 13 can also take intermediate positions, so-called "relaxing" positions, between these two extreme positions.

In addition, a seat unit 12.1, 12.2 comprises a foot area 17 intended to support the feet of a passenger when the corresponding seat 13 is in a bed position. The foot area 17 may comprise a fixed cushion, in particular arranged in a housing of a console 18 open towards the corresponding seat 13. Preferably, the fixed cushion of the foot area 17 is located in an extension of the seat 13 when the latter is in the "bed" position.

As can be seen in FIGS. 2, 3, and 4, a seat unit 12.1, 12.2 may also comprise a fixed shell 20 surrounding at least party the seat 13 so as to create an at least partly closed interior space in which the seat 13 is arranged. Such a shell 20 therefore makes it possible to guarantee the privacy of each passenger.

Each seat 13 has an axis X2 corresponding to a horizontal axis in a median vertical plane of the seat.

The arrangement 11 of seat units 12.1, 12.2 comprises at least one rear group 21 of two seat units 12.1, 12.2 and at least one front group 21 of two seat units 12.1, 12.2.

It should be noted that the terms "front" and "rear" used in connection with the expression "seat unit" or "group of seat units" locally define a relative position of a seat unit 12.1 12.2 or a group 21 of seat units inside a column, and in no way refer to an orientation of a seat inside the aircraft cabin 10. In other words, the expression "front seat unit" or "front group of seats unit" means that the seat unit 12.1, 12.2 or the group 21 of seats units is positioned directly in front of another seat unit or another group of seat units within a column of seat units, while the term "rear seat unit" or "rear group of seat unit" means that the seat unit 12.1, 12.2 or group 21 of seat units is positioned directly behind another seat unit or another group of seat units within a column of seat units.

In a group 21 of seat units 12.1, 12.2, the seats 13 can be slightly longitudinally offset relative to each other by a distance L1 of a few centimeters, as can be seen in FIG. 6. Alternatively, the seats 13 of a group 21 are arranged side by side so that there is no longitudinal offset between the seats 13 of the same group 21.

Each group 21 of two seat units comprises a seat unit 12.1 arranged on the side of an aisle, so-called "aisle-side seat unit" and a seat unit 12.2 arranged on the side of a window, so-called "window-seated unit".

As can be seen in particular in FIGS. 1 and 5, each seat 13 of a group 21 of seat units 12.1, 12.2 has an axis X2 forming a non-zero angle A1 in particular between 5 degrees and 30 degrees with respect to the longitudinal axis X1 of the aircraft cabin 10, so that the seats 13 of a group 21 of seat units 12.1, 12.2 face an aisle 25.

The axes X2 of the seats 13 of the same group 21 of seat units 12.1, 12.2 form a non-zero angle A2 relative to each other, in particular between 5 and 15 degrees. In other words, the axes X2 of the seats 13 of the same group 21 form different angles with respect to the longitudinal axis X1 of the aircraft cabin 10. In this case, the axes X2 of two adjacent seats 13 of a group 21 preferably intersect towards the rear of the group 21 of seats.

Alternatively, the axes X2 of the seats of the same group 21 of seat units are parallel to each other. The axes X2 of the seats 13 of the same group 21 then form the same angle with respect to the longitudinal axis X1 of the aircraft cabin 10.

The seats 13 of a group of seat units 21 may form a block of two seats mounted on a common support pallet which is fixed to the rails of the aircraft cabin 10 by means of locks of known type.

Furthermore, as can be seen in FIG. 1, a first access passage 23 to the aisle 25 associated with the window-side seat unit 12.2 of the rear group 21 extends between the foot area 17 and the seating surface 15 of the aisle-side seat unit 12.1 of the rear group 21. This first access passage 23 corresponds to the leg space provided for the neighboring passenger in the aisle side seat unit 12.1.

A second access passage 24 to the aisle 25 associated with the window-side seat unit 12.2 of the rear group 21 extends between the aisle-side seat unit 12.1 of the front group 21 and the foot area 17 of the aisle-side seat unit 12.1 of the rear group 21.

As illustrated in FIG. 5, the second access passage 24 has a width L2 less than the width L3 of the first access passage 23. In an exemplary embodiment, the first access passage 23 has a width L3 of between 27.94 cm (11 inches) and 76.20 cm (30 inches) in order to facilitate access to the aisle-side seats 25 for people with reduced mobility. The second passage 24 has a width L2 of between 10.16 cm (4 inches) and 27.94 cm (11 inches), the value of 27.94 cm (11 inches) being excluded.

Thus, the second access passage 24 allows all passengers located on the side of the windows to access the aisle 25 without disturbing the neighboring passenger. The first access passage 23 can also be used to access the aisle 25, in particular in the event of an emergency evacuation.

Direct access to the aisle 25 is facilitated by the fact that the feet of a passenger are located on the side of the aisle 25.

Advantageously, as can be seen in FIG. 5, there is a longitudinal overlap between at least a portion of the foot area 17 of the aisle-side seat unit 12.1 of the rear group 21 and at least a portion of the backrest 14 of the aisle-side seat unit 12.1 of the front group 21.

Preferably, there is also a longitudinal overlap L4 between at least an overlapping portion of the foot area 17 of the window-side seat unit 12.2 of the rear group 21 and at least a portion of the backrest. 14 of the window-side seat unit 12.2 of the front group 21. The overlapping portion of the foot area 17 with at least a portion of the backrest 14 of the window-side seat unit 12.2 of the front group 21 is located between the two seat units 12.1, 12.2 of the front group 21.

Preferably, the foot area 17 is integrated into a console 18 located at a distance from the corresponding seat 13. The console 18 may be provided with an upper wall 27 that can serve as a table, as it is the case for the console 18 of the aisle-side seat unit 12.1 (see FIGS. 3 and 4). As a variant, the console 18 could be provided with a storage cabinet 28, as it is the case for the console 18 of the window-side seat unit 12.2 (cf. FIGS. 3 and 4). The storage cabinet 28 may be vertically superposed at least in part with the foot area 17.

As can be seen in FIGS. 2, 3, and 4, a partition 30 may separate the seats 13 of the same group 21. The partition 30 may be removable in order to facilitate communication between two passengers side by side.

The partition 30 extends from a shell 20 located at the rear of the seats 13 to a front edge of a seating surface 15 of a seat 13, that is to say at the level of the leg space of a passenger.

A transverse wall 31, in particular formed by a shell 20, may also separate the front group 21 of seat units 12.1, 12.2 and the rear group 21 of seat units 12.1, 12.2. The transverse wall 31 extends from a wall of the aircraft cabin to the aisle 25.

An aisle-side seat unit 12.1, 12.2 may include a retractable door 33 so as to be able to selectively open or close the first access passage 23, as shown in FIG. 1.

A seat unit 12.1, 12.2 may include a display panel 34 positioned in front of the passenger, as shown in FIGS. 2 and 4. For this purpose, the display panel 34 may be integrated into a dedicated housing of a shell 20 of a front seat 13 or on a movable arm mechanically connected to the shell 20.

As can be seen in FIGS. 5 and 6, a seat unit 12.1, 12.2 preferably comprises at least one armrest 35 provided in a central cabinet 36 between two seats 13 of the same group 21.

A seat unit 12.1, 12.2 comprises a meal flap 37 shown in FIG. 5 movable between a deployed position and a stored position. In the stored position, the meal flap 37 can be housed in a housing of the central cabinet 36, as shown in the figures. Alternatively, the meal flap 37 may be integrated into another part of a seat unit 12.1, 12.2.

According to a particular embodiment, a foot zone 17 may be narrower than the seating surface 15 so that the sleeping surface of a seat 13 in the bed position has a reduced width at the level of the foot area 17. The sleeping surface can have a length between 190.50 cm (75 inches) and 203.20 cm. (80 inches). The aisle 25 may have a width of between 45.72 cm (18 inches) and 63.50 cm (25 inches) in order to facilitate the service carried out by the flight staff.

In addition, a window-side seat unit 12.2 may optionally include a fixed cushion 38, as shown in FIG. 6. In particular, the fixed cushion 38 allows maximization of the sleeping surface. To this end, the fixed cushion 38 is advantageously intended to be positioned in an extension of the seat 13, in particular a lateral extension, when the latter is in the "bed" position.

As can be seen in FIG. 1, the arrangement 11 of seat units 12.1, 12.2 comprises two columns 40a, 40b of groups 21 of two seat units 12.1, 12.2 preferably extending along the axis longitudinal X1 of the aircraft cabin 10. Inside a column 40a, 40b, the seat units 12.1, 12.2 can be oriented in such a way that the seat 13 is oriented to the forward and/or backward direction of the aircraft. The two columns 40a, 40b are separated from each other by the aisle 25.

Alternatively, the aircraft cabin 10 may include two aisles 25 each defined by a central column of groups 21 of seat units 12.1. 12.2 and a side column of groups 21 of corresponding seat units 12.1, 12.2.

The optimization of the density of the aircraft cabin 10 with respect to the dimensions of the latter is in particular possible by modifying the angle A1 of the axis X2 of the seats with respect to the longitudinal axis X1 of the aircraft cabin 10. It is also possible to modify the overlapping length L4 between the seat units 12.1, 12.2.

It is possible to vary the pitch between two seats 13 between 152.40 cm (60 inches) and 203.20 cm (80 inches), according to the dimensions of the aircraft cabin 10. It is recalled that the pitch between two seats 13 corresponds to the distance between two reference points of two adjacent seats 13 located one behind the other.

Of course, the different characteristics, variants and/or embodiments of the present invention can be associated with each other in various combinations insofar as they are not incompatible or mutually exclusive.

Of course, the invention is not limited to the above-described embodiments, provided only as an example. It encompasses various modifications, alternative forms and other variants that can be considered by the skilled person within the framework of the present invention, including any combination of the various above-described modes of operation, which may be taken separately or in combination.

The invention claimed is:

1. An aircraft cabin having a longitudinal axis and comprising at least one aisle and an arrangement of seat units, a seat unit comprising a seat provided with a seating surface and a backrest as well as a foot area, said seat being movable between a seating position and a bed position, said arrangement of seat units comprising:
   at least one rear group of two seat units,
   at least one front group of two seat units,
   each group of two seat units comprising an aisle-side seat unit and a window-side seat unit,
   characterized in that
   each seat of a group of seat units having an axis forming a non-zero angle with respect to the longitudinal axis of the aircraft cabin, so that the seats of each group face the aisle,
   a first access passage to the aisle associated with the window-side seat unit of the rear group extending between the foot area and the seating surface of the aisle-side seat unit of the rear group, and a second access passage to the aisle associated with the window-side seat unit of the rear group extending between the aisle-side seat unit of the front group and the foot area of the aisle-side seat unit of the rear group, and in that there is a longitudinal overlap between at least a portion of the foot area of the aisle-side seat unit of the rear group and at least a portion of the backrest of the aisle-side seat unit of the front group.

2. The aircraft cabin according to claim 1, characterized in that a width of the second access passage is less than a width of the first access passage.

3. The aircraft cabin according to claim 1, characterized in that there is a longitudinal overlap between at least a portion of the foot area of the window-side seat unit of the rear group and at least a portion of the backrest of the window-side seat unit of the front group.

4. The aircraft cabin according to claim 3, characterized in that the overlapping portion of the foot area with at least a portion of the backrest of the window-side seat unit of the front group is located between the two seat units of the front group.

5. The aircraft cabin according to claim 1, characterized in that the axes of the seats of the same group of seat units are parallel to each other.

6. The aircraft cabin according to claim 1, characterized in that the axes of the seats of the same group of seat units form a non-zero angle with respect to each other.

7. The aircraft cabin according to claim 1, characterized in that the seats of the same group of seat units are arranged side by side to each other.

8. The aircraft cabin according to claim 1, characterized in that the seats of the same group of seat units are longitudinally offset relative to one other.

9. The aircraft cabin according to claim 1, characterized in that a partition separates the seats of the same group of seat units.

10. The aircraft cabin according to claim 9, characterized in that the partition extends from a shell at the rear of the seats to a front edge of a seating surface of a seat.

11. The aircraft cabin according to claim 1, characterized in that an aisle-side seat unit comprises a retractable door so as to be able to selectively open or close the first access passage.

12. The aircraft cabin according to any one of the claim 1, characterized in that a foot area is integrated into a console provided with an upper wall which can be used as a table and/or in a console provided with a storage cabinet.

13. The aircraft cabin according to claim 1, characterized in that a seat unit comprises a display panel.

14. The aircraft cabin according to claim 1, characterized in that a seat unit comprises at least one armrest.

15. The aircraft cabin according to claim 1, characterized in that a seat unit comprises a meal flap movable between a deployed position and a stored position.

16. The aircraft cabin according to claim 1, characterized in that a transverse wall separates the front group of seat units and the rear group of seat units, said transverse wall extending from a wall of the aircraft cabin to the aisle.

17. The aircraft cabin according to claim 1, characterized in that the first access passage has a width of between 27.94 cm (11 inches) and 76.20 cm (30 inches).

18. The aircraft cabin according to claim 1, characterized in that the second access passage has a width of between 10.16 cm (4 inches) and 27.94 cm (11 inches), the value of 27.94 cm (11 inches) being excluded.

* * * * *